US011158890B2

(12) United States Patent
Thomas et al.

(10) Patent No.: US 11,158,890 B2
(45) Date of Patent: Oct. 26, 2021

(54) BATTERY PACK OPTIMIZATION FOR THERMAL MANAGEMENT

(71) Applicant: HYLIION INC., Austin, TX (US)

(72) Inventors: David Scott Thomas, Royal Oak, MI (US); Alex Ho Yang, Ann Arbor, MI (US); Timothy Hughes, South Lyon, MI (US)

(73) Assignee: Hyliion Inc., Cedar Park, TX (US)

( * ) Notice: Subject to any disclaimer, the term of this patent is extended or adjusted under 35 U.S.C. 154(b) by 316 days.

(21) Appl. No.: 15/999,072

(22) Filed: Aug. 17, 2018

(65) Prior Publication Data
US 2019/0058227 A1 Feb. 21, 2019

Related U.S. Application Data

(60) Provisional application No. 62/547,549, filed on Aug. 18, 2017.

(51) Int. Cl.
  *H01M 10/613* (2014.01)
  *H01M 10/6572* (2014.01)
  (Continued)

(52) U.S. Cl.
  CPC ....... *H01M 10/613* (2015.04); *H01M 10/625* (2015.04); *H01M 10/6551* (2015.04);
  (Continued)

(58) Field of Classification Search
  CPC ............. H01M 10/613; H01M 10/625; H01M 10/647; H01M 10/6551; H01M 10/6556;
  (Continued)

(56) References Cited

U.S. PATENT DOCUMENTS 5,756,227 A    5/1998  Suzuki et al.
2008/0259569 A1* 10/2008 Lin .................. H01M 10/6551
                                                   361/704
(Continued)

FOREIGN PATENT DOCUMENTS

DE   102015011281 A1   3/2016
EP       2017919 A1    3/2011
(Continued)

OTHER PUBLICATIONS

International Search Report, Application No. PCT/US2018/000287, dated Mar. 13, 2019, 6 pages.
Written Opinion, Application No. PCT/US2018/000287, dated Mar. 13, 2019, 11 pages.

*Primary Examiner* — Adam A Arciero
(74) *Attorney, Agent, or Firm* — Baker Botts L.L.P.

(57) ABSTRACT

A battery pack for an electric vehicle or a hybrid vehicle may include a housing, a stack of battery cells disposed within the housing, and a cooling subassembly. The housing typically holds the cell stack together, and the cooling subassembly typically cools the cell stack to prevent damage to the battery cells and to maintain the performance of the battery cells. The cooling subassembly may include a cold plate defining a liquid flow channel and one or more thermoelectric devices (TEDs) that are operable to cool the cell stack when current is supplied thereto. Heat spreaders may be employed within the battery pack, and exemplary configurations of components to thermally and mechanically couple the cooling subassembly are described.

12 Claims, 20 Drawing Sheets

(51) Int. Cl.
*H01M 10/6556* (2014.01)
*H01M 50/10* (2021.01)
*H01M 50/147* (2021.01)
*H01M 10/625* (2014.01)
*H01M 10/6551* (2014.01)
*H01M 10/6555* (2014.01)
*H01M 50/20* (2021.01)
*H01M 10/647* (2014.01)
*H01M 10/6557* (2014.01)

(52) U.S. Cl.
CPC ... *H01M 10/6555* (2015.04); *H01M 10/6556* (2015.04); *H01M 10/6572* (2015.04); *H01M 50/10* (2021.01); *H01M 50/147* (2021.01); *H01M 10/647* (2015.04); *H01M 10/6557* (2015.04); *H01M 50/20* (2021.01); *H01M 2220/20* (2013.01)

(58) Field of Classification Search
CPC ......... H01M 10/6557; H01M 10/6572; H01M 2220/20; H01M 2/024; H01M 2/1077; H01M 2/1083
See application file for complete search history.

(56) References Cited

U.S. PATENT DOCUMENTS

| | | | |
|---|---|---|---|
| 2010/0035142 A1* | 2/2010 | Ha | H01M 2/0207 429/153 |
| 2010/0236854 A1 | 9/2010 | Nakamura | |
| 2011/0003187 A1 | 1/2011 | Graaf et al. | |
| 2011/0293974 A1 | 12/2011 | Yoon et al. | |
| 2012/0177965 A1 | 7/2012 | Lee et al. | |
| 2014/0205875 A1 | 7/2014 | Schmidt | |
| 2014/0356659 A1 | 12/2014 | Kado | |
| 2014/0363710 A1 | 12/2014 | Lee et al. | |
| 2017/0352851 A1* | 12/2017 | Kuboki | H01M 2/266 |
| 2018/0166621 A1* | 6/2018 | Ranalli | H01M 10/625 |
| 2019/0020081 A1* | 1/2019 | Spillner | H01M 10/667 |

FOREIGN PATENT DOCUMENTS

| | | | | |
|---|---|---|---|---|
| WO | 2016200899 A2 | 12/2016 | | |
| WO | WO-2016200937 A1 * | 12/2016 | ......... | H01M 10/625 |
| WO | WO-2017132246 A1 * | 8/2017 | ......... | H01M 10/613 |

* cited by examiner

BATTERY PACK OPTIMIZATION FOR THERMAL MANAGEMENT

CROSS-REFERENCE TO RELATED APPLICATION(S)

This application claims the benefit under 35 U.S.C. § 119(e) of U.S. Provisional Patent Application No. 62/547,549 filed Aug. 18, 2017, which is incorporated by reference herein.

FIELD

The present disclosure relates to battery pack optimization for thermal management.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A battery pack in an electric vehicle or a hybrid vehicle typically includes a housing, a stack of lithium ion battery cells disposed within the housing, and a cooling subassembly disposed below the cell stack. The housing holds the cell stack together, and the cooling subassembly cools the cell stack to prevent damage to the battery cells and to maintain the performance of the battery cells. The cooling subassembly typically includes a cold plate defining a liquid flow channel, and a plurality of thermoelectric devices (TEDs) that are operable to cool the cell stack when current is supplied thereto.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
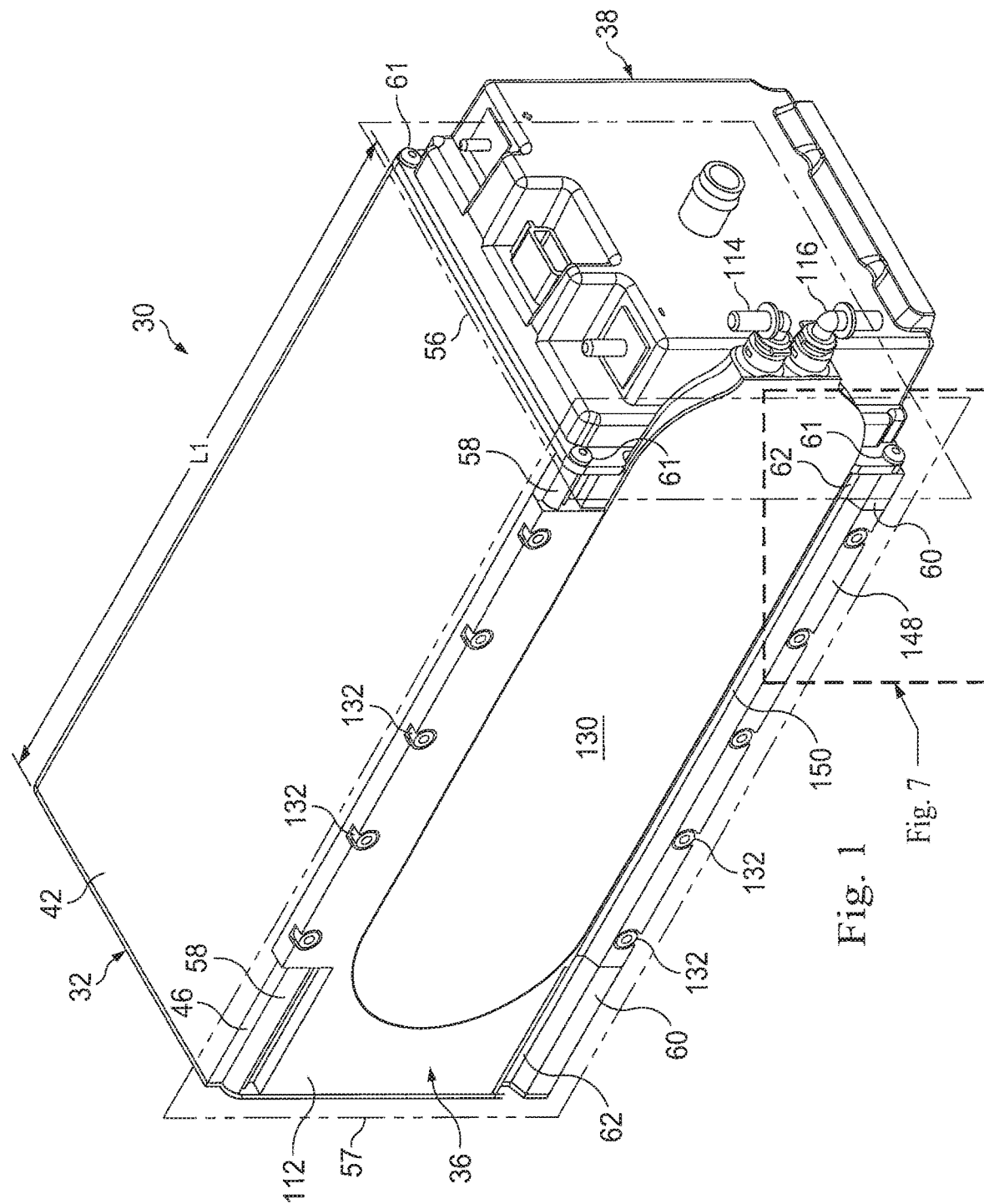
FIG. 1 is a perspective view of a battery pack according to the present disclosure, the battery pack including a cooling subassembly.

Referring now to FIGS. 1-7, a battery pack 30 includes a housing 32, a cell stack 34 disposed within the housing 32, a cooling subassembly 36 located on one side of the housing 32, and a cover 38 that fits over an open end 40 of the housing 32. The housing 32 can be extruded from a metal such as aluminum. The cover 38 can be molded from plastic. The housing 32 has a top wall 42, a bottom wall 44, a first sidewall 46, a second sidewall 48 opposite of the first sidewall 46, and an end wall 50 opposite of the open end 40 of the housing 32. The open end 40 and the end wall 50 adjoin opposite ends of the top wall 42, the bottom wall 44, and the first and second sidewalls 46 and 48.

The first sidewall 46 has an inner surface 52, an outer surface 54, and a window or opening 55 that extends through the inner and outer surfaces 52 and 54. The opening 55 is located closer to the open end 40 of the housing 32 than the end wall 50 of the housing 32. For example, the opening 55 is longitudinally spaced apart from the end wall 50 by a first distance D1, and the opening 55 is longitudinally spaced apart from the open end 40 by a second distance D2 that is less than the first distance. In addition, as shown in FIG. 1, the open end 40 is disposed within a first plane 56, and the opening 55 is disposed within a second plane 57 that intersects the first plane 56.

The first sidewall 46 includes a pair of hollow cylindrical bosses 58 disposed on opposite sides of the opening 55 and a pair of mounting feet 60 disposed on opposite sides of the opening 55. The bosses 58 and the mounting feet 60 form part of the outer surface 54 of the first sidewall 46. The ones of the bosses 58 and the mounting feet 60 located adjacent to the open end 40 receive fasteners (e.g., screws) 61 that attach the cover 38 to the first sidewall 46. The ones of the bosses 58 and the mounting feet 60 located adjacent to the end wall 50 can receive fasteners (not shown) that attach the end wall 50 to the first sidewall 46. Alternatively, the end wall 50 can be integrally formed with the remainder of the housing 32. Each of the mounting feet 60 defines a groove 62 for mounting the battery pack 30 in a vehicle.

Figure 12:
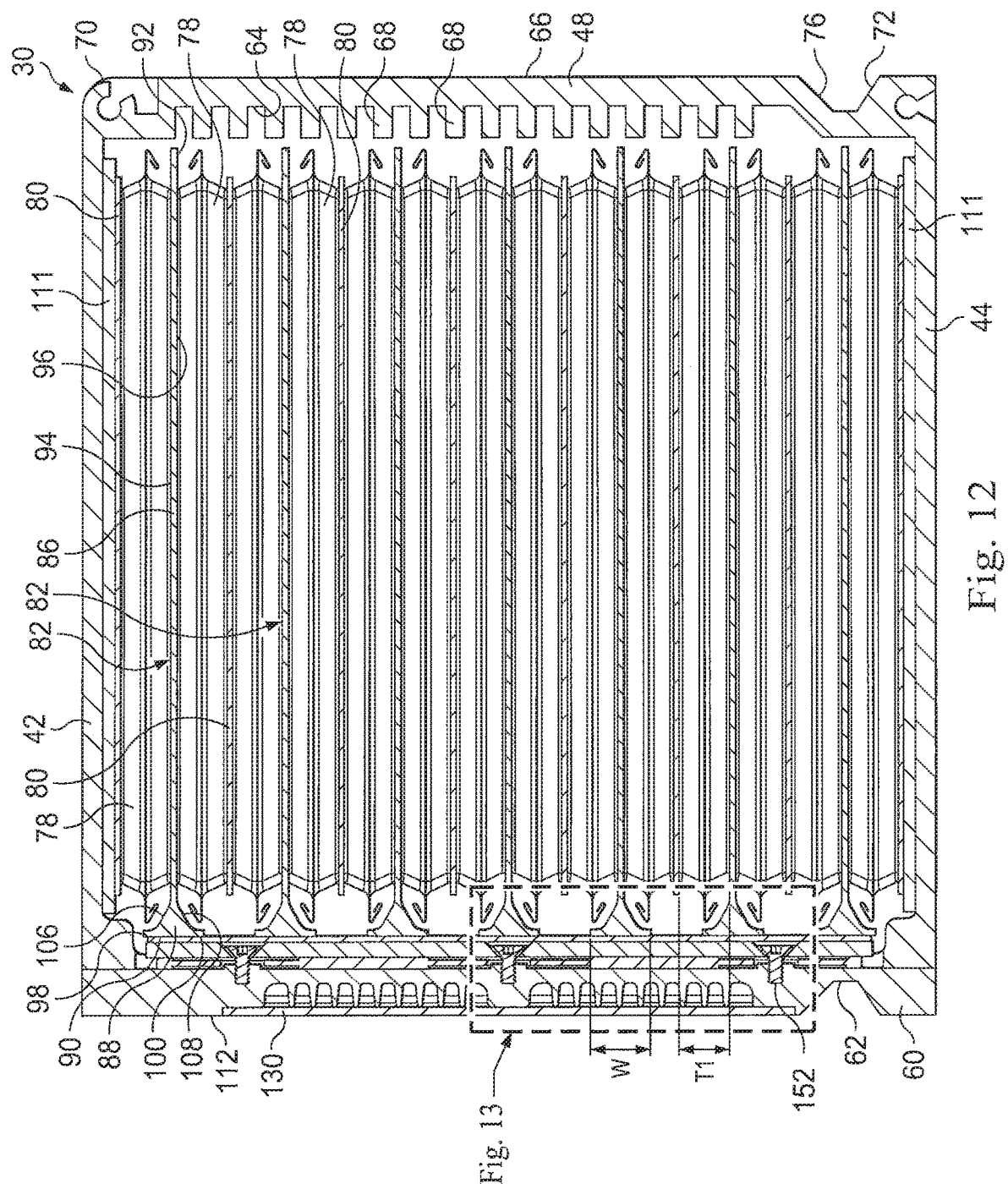
FIG. 12 is a cross-sectional view of the battery pack of FIG. 1 taken along a line 12-12 shown in FIG. 7.

With brief additional reference to FIG. 12, the second sidewall 48 has an inner surface 64, an outer surface 66, and a plurality of cooling fins 68 projecting from and/or forming a part of the inner surface 64. The second sidewall 48 includes a hollow cylindrical boss 70 and a mounting foot 72 similar to the bosses 58 and the mounting feet 60, respectively, on the first sidewall 46. However, since there is no cooling subassembly attached to the second sidewall 48, the cylindrical boss 70 and the mounting foot 72 may extend along the entire length L1 (FIG. 1) of the housing 32. The ends of the boss 70 and the mounting foot 72 located adjacent to the open end 40 receive fasteners (e.g., screws) 74 (FIG. 3) that attach the cover 38 to the second sidewall 48. The ends of the boss 70 and the mounting foot 72 located adjacent to the end wall 50 can receive fasteners (not shown) that attach the end wall 50 to the second sidewall 48. Alternatively, as discussed above, the end wall 50 can be integrally formed with the remainder of the housing 32. Each of the mounting feet 72 defines a groove 76 for mounting the battery pack 30 in a vehicle.

Figure 5:
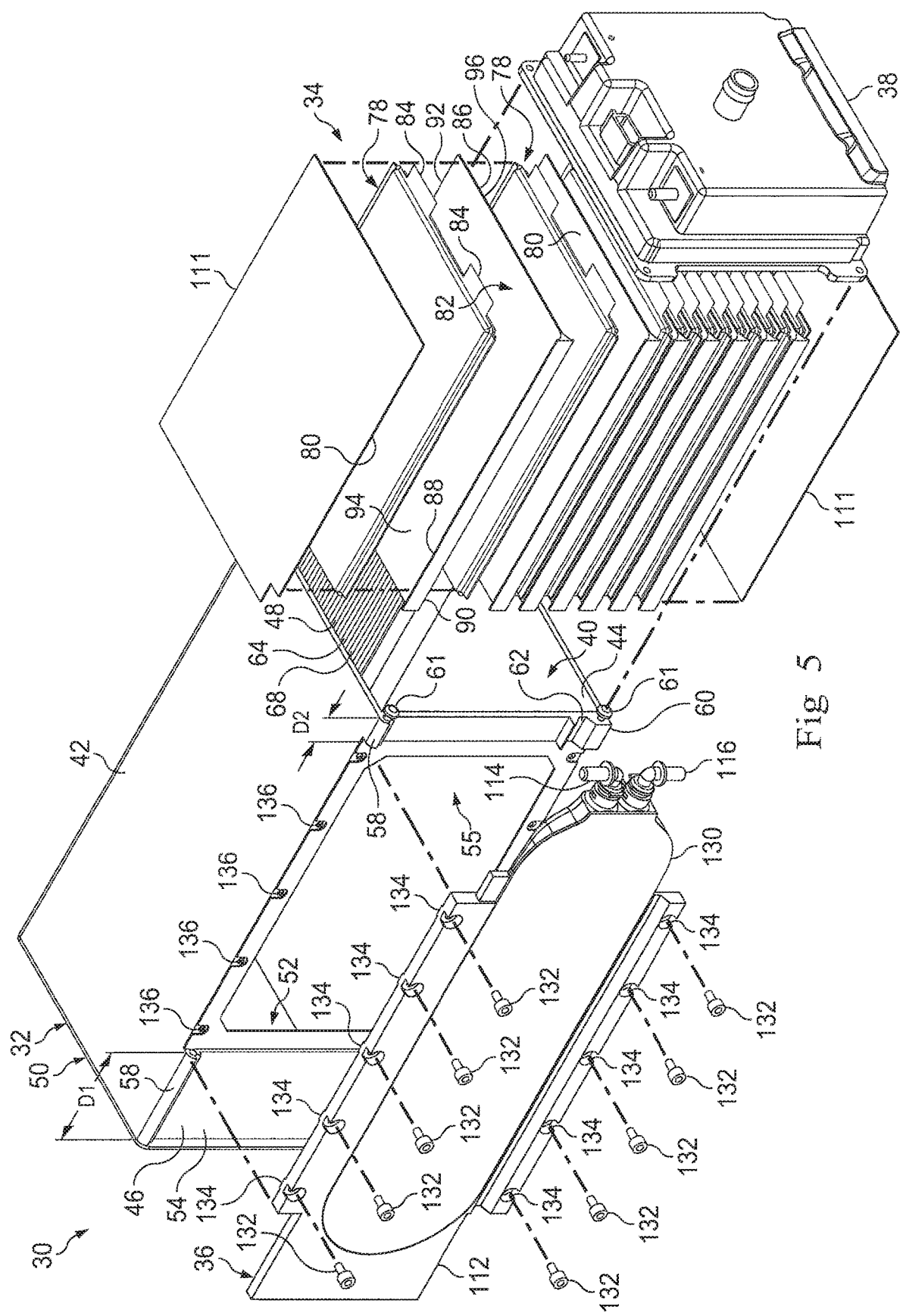
FIG. 5 is an exploded perspective view of the battery pack of FIG. 1.
Figure 6:
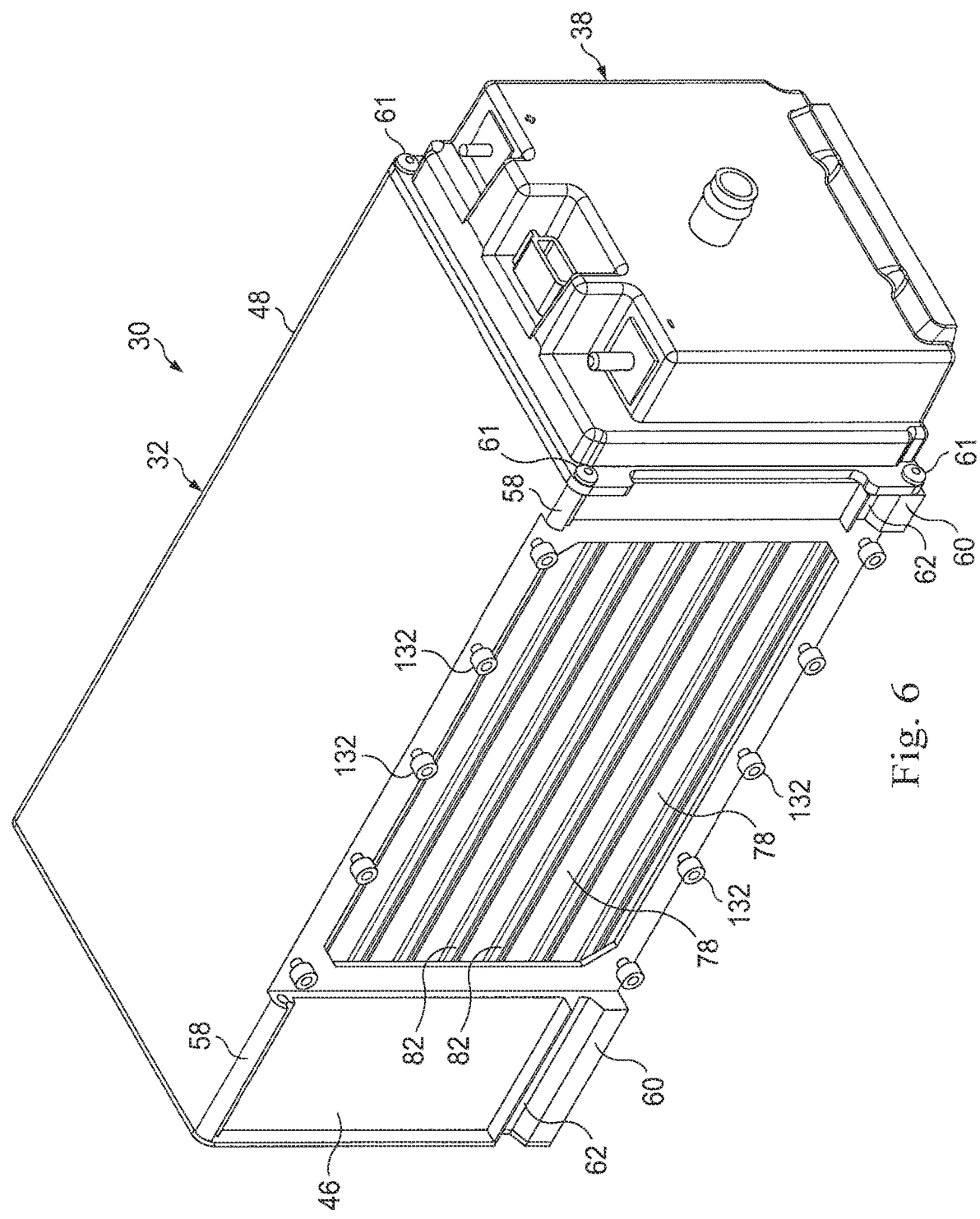
FIG. 6 is a perspective view of the battery pack of FIG. 1 with the cooling subassembly removed to illustrate an opening in a sidewall of the battery pack.

Referring now to FIGS. 5 and 12, the cell stack 34 includes a plurality of battery cells 78, a plurality of sheet insulators 80, and a plurality of heat spreaders 82. The sheet insulator 80 and the heat spreaders 82 are alternately disposed between adjacent ones of the battery cells 78. Each of the battery cells 78 is a lithium ion prismatic battery cell. The sheet insulators 80 electrically insulating the battery cells 78 from one another. The sheet insulators 80 can be made from compression foam. The heat spreaders 82 distribute heat from the battery cells 78 to the first sidewall 46 of the housing 32. The heat spreaders can be extruded from a metal such as aluminum.

Each of the battery cells 78 includes a pair of terminals or tabs 84. The tabs 84 are disposed adjacent to the open end 40 of the housing 32. In this regard, the cover 38 may include a power management module and/or a thermal management module. The power management module is electrically connected to the tabs 84 of the battery cells 78 and controls the amount of power flowing to and from the battery cells 78. Thus, the tabs 84 may be disposed adjacent to the open end 40 to reduce the amount of wiring required for this electrical connection. The thermal management module controls the temperature of the battery cells 78 as discussed in more detail below.

In a conventional battery pack, the cooling subassembly is located at the bottom of the battery pack, and the tabs of the battery cells are located at the top of the battery pack. Thus, the cooling subassembly is located on the opposite side of the battery pack than the tabs of the battery cells, where most of the heat is generated in the battery pack. In addition, since the cooling subassembly is located at the bottom of the battery pack, the battery cells cannot be stacked as high as they may otherwise be if the cooling subassembly was not located at the bottom of the battery pack.

In contrast, as discussed above, the cooling subassembly 36 is mounted on the first sidewall 46 of the housing 32, and the tabs 84 of the battery cells 78 are disposed adjacent to the open end 40 of the housing 32 that adjoins the first sidewall 46. Thus, the cooling subassembly 36 is located closer to the tabs 84 of the battery cells 78 relative to conventional battery packs, which improves the thermal management of the battery pack 30. In addition, since the cooling subassembly 36 is located on the side of the housing 32 rather than the bottom of the housing 32, the battery cells 78 can be stacked higher in the housing 32 relative to conventional battery packs. Therefore, for a given battery pack packaging space, the battery pack 30 can include more battery cells than conventional battery packs.

Each of the heat spreaders 82 includes a flat body 86 and a head 88. The flat body 86 has a first longitudinal side 90, a second longitudinal side 92 opposite of the first longitudinal side 90, a first major surface 94 extending between the first and second longitudinal sides 90 and 92, and a second major surface 96 opposite of the first major surface 94. The head 88 is attached to the first longitudinal side 90 of the flat body 86.

Figure 14:
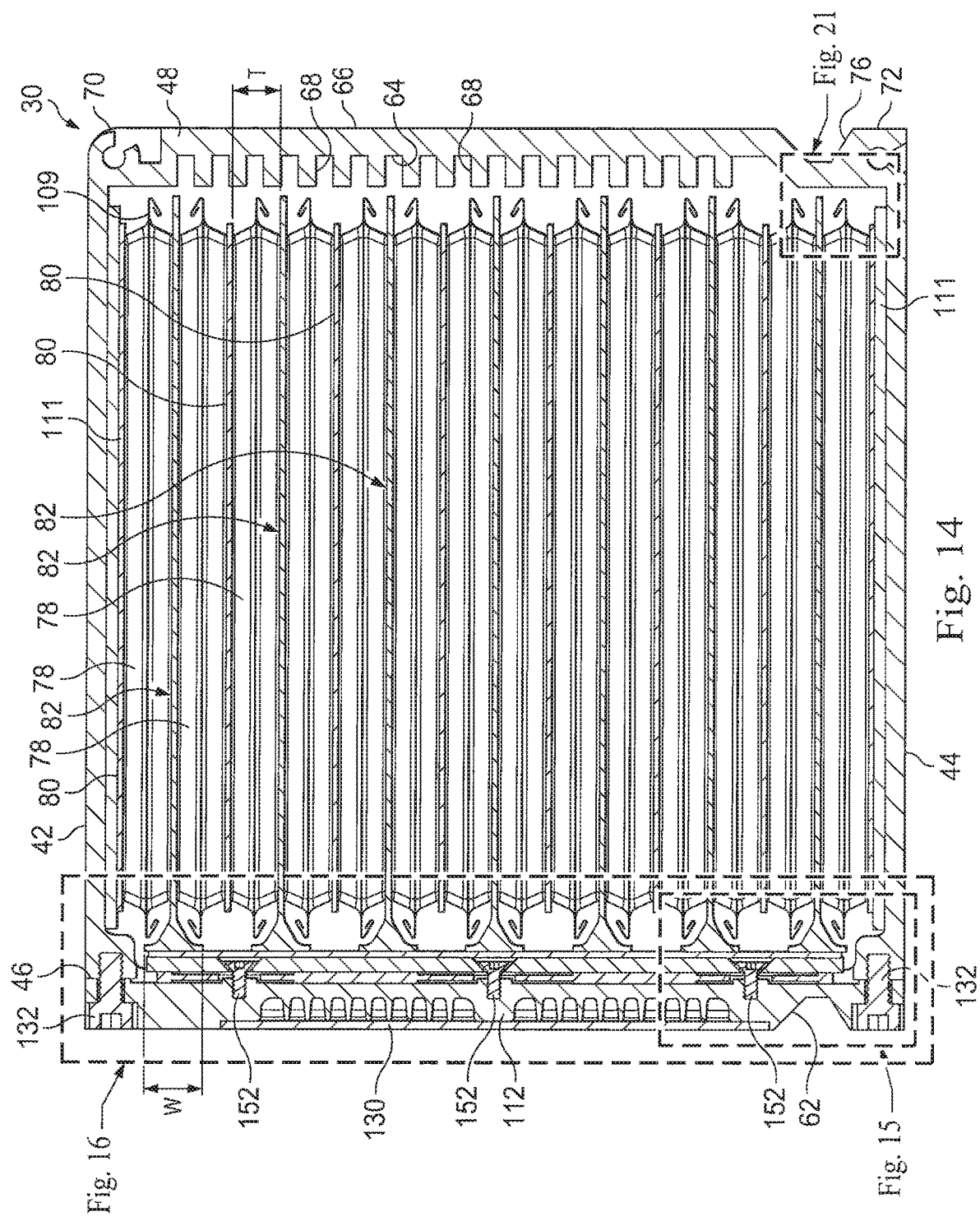
FIG. 14 is a cross-sectional view of the battery pack of FIG. 1 taken along a line 14-14 shown in FIG. 7.
Figure 15:
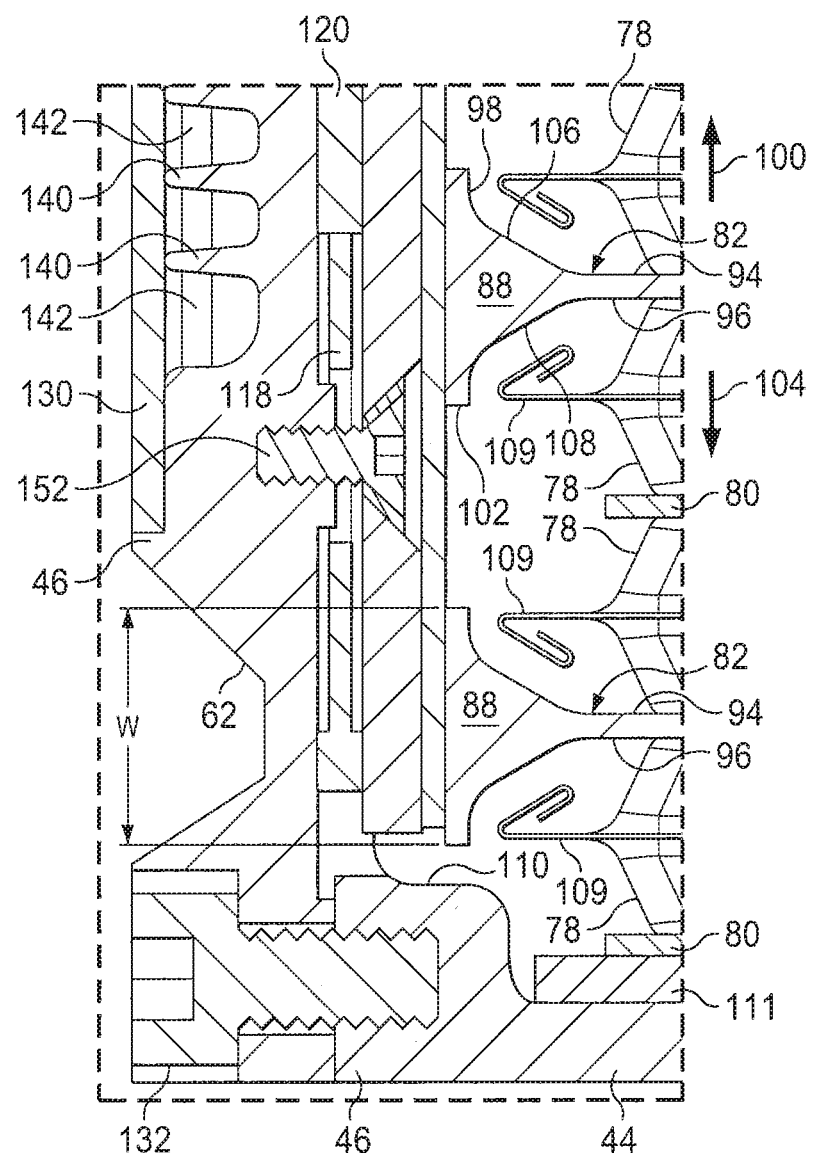
FIG. 15 is a cross-sectional view of a portion of the battery pack of FIG. 1 within a rectangle 15 shown in FIG. 14.

The head 88 and the flat body 86 collectively have a T-shaped profile as best shown in FIG. 12. With additional reference to FIGS. 13-15, a first portion 98 of the head 88 projects from the first major surface 94 of the flat body 86 in a first direction 100. A second portion 102 of the head 88 projects from the second major surface 96 of the flat body 86 in a second direction 104 opposite of the first direction 100. Each of the battery cells 78 has a thickness T1, and the head 88 of each of the heat spreaders 82 has a width W that is less than two times the thickness T1. For example, the width W of the head 88 may be less than or equal to a product of an integer N (e.g., 1.5, 1.0, 0.5) and the thickness T1. Of course, if the width W of the head 88 is less than or equal to a product of the integer N and the thickness T1, and N is equal to 1, the width W of the head 88 is less than or equal to the thickness T1.

Each of the heat spreaders 82 includes a first chamfer 106 and a second chamfer 108. The first chamfer 106 extends between and connects the first portion 98 of the head 88 and the first major surface 94 of the flat body 86. The second chamfer 108 extends between and connects the second portion 102 of the head 88 and the second major surface 96 of the flat body 86. The first and second chamfers 106 and 108 increase the amount of heat absorbing mass of the heat spreaders 82 and place the heat spreaders 82 in closer proximity to seals 109 of the battery cells 78. Thus, the first and second chamfers 106 and 108 may increase the amount of heat absorbed by the heat spreaders 82.

Since the first and second chamfers 106 improve the heat absorption performance of the heat spreaders 82, the first and second portions 98 and 102 of the head 88 may be shorter than otherwise possible. In other words, the first portion 98 of the head 88 may project from the first major surface 94 of the flat body 86 in the first direction 100 to a lesser extent, and the second portion 102 of the head 88 may project from the second major surface 96 of the flat body 86 in the second direction 104 to a lesser extent. Shortening the first and second portions 98 and 102 of the head 88 reduces the surface area of the head 88, which degrades the ability of the heat spreaders 82 to absorb heat. Thus, the first and second chamfers 106 offset this degradation in heat absorption ability, and therefore enable enables the width W of the head 88 to be less than two times the thickness T1 of each of the battery cells 78 as described above.

In addition, shortening the first and second portions 98 and 102 of the head 88 provides clearance for bosses 110 that define blind holes 136, which receive fasteners (e.g., screws) 132 that attach the cooling subassembly 36 to the housing 30. Shortening the first and second portions 98 and 102 of the head 88 also provides clearance for electrical connectors and wiring within the battery pack 30. As a result, the overall packaging space required for the battery pack 30 may be reduced.

As best shown in FIG. 5, the battery pack 30 further includes a pair of end plates 111 disposed on opposite sides of the cell stack 34. The end plates 111 electrically insulate the battery cells 78 from the top and bottom walls 42 and 44 of the housing 32. The end plates 111 can be molded from plastic.

Referring now to FIGS. 5 and 8-13, the cooling subassembly 36 fits over the opening 55 in the first sidewall 46 and is disposed adjacent to the heads 88 of the heat spreaders 82. The cooling subassembly 36 absorbs heat generated by the battery cells 78. The cooling subassembly 36 includes a cold plate 112, an inlet fitting 114, an outlet fitting 116, a circuit board 118, a plurality of thermoelectric devices (TEDs) 120, a heat distribution plate 122, a gap pad 124, a plurality of insulating strips 126, a gasket 128, and a cover plate 130. The cooling subassembly 36 can be attached to the housing 32 using the fasteners 132, which extend through holes 134 in the cold plate 112 and into the blind holes 136 in the first sidewall 46 of the housing 32. The gasket 128 seals the interface between the cold plate 112 and the first sidewall 46 of the housing 32. The cold plate 112 can be extruded from a metal such as aluminum. The gasket 128 can be molded from a rubber polymer.

Figure 8:
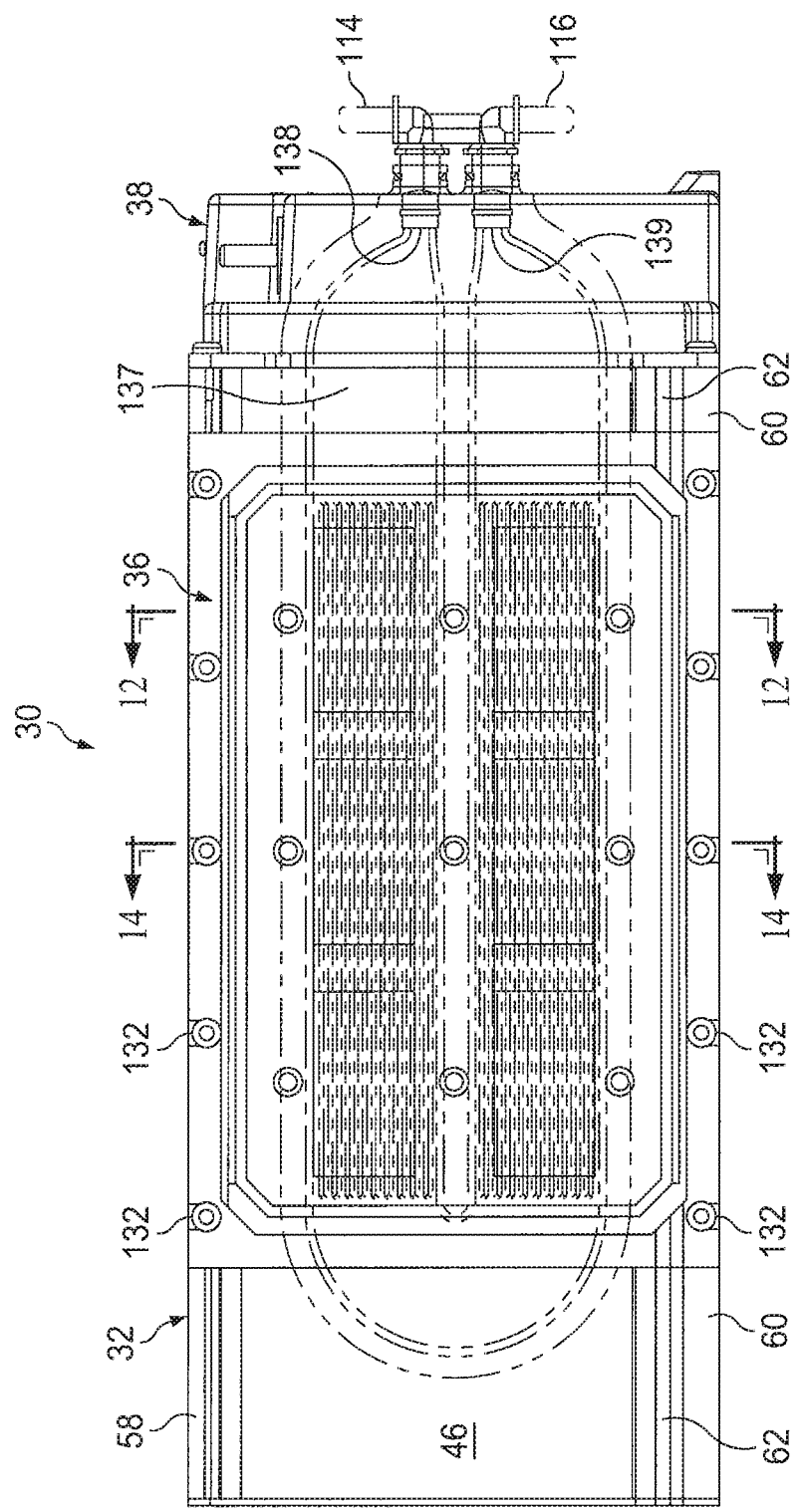
FIG. 8 is a side view of the battery pack of FIG. 1 with portions of the cooling subassembly shown in phantom to illustrate fluid flow paths in the cooling subassembly.
Figure 9:
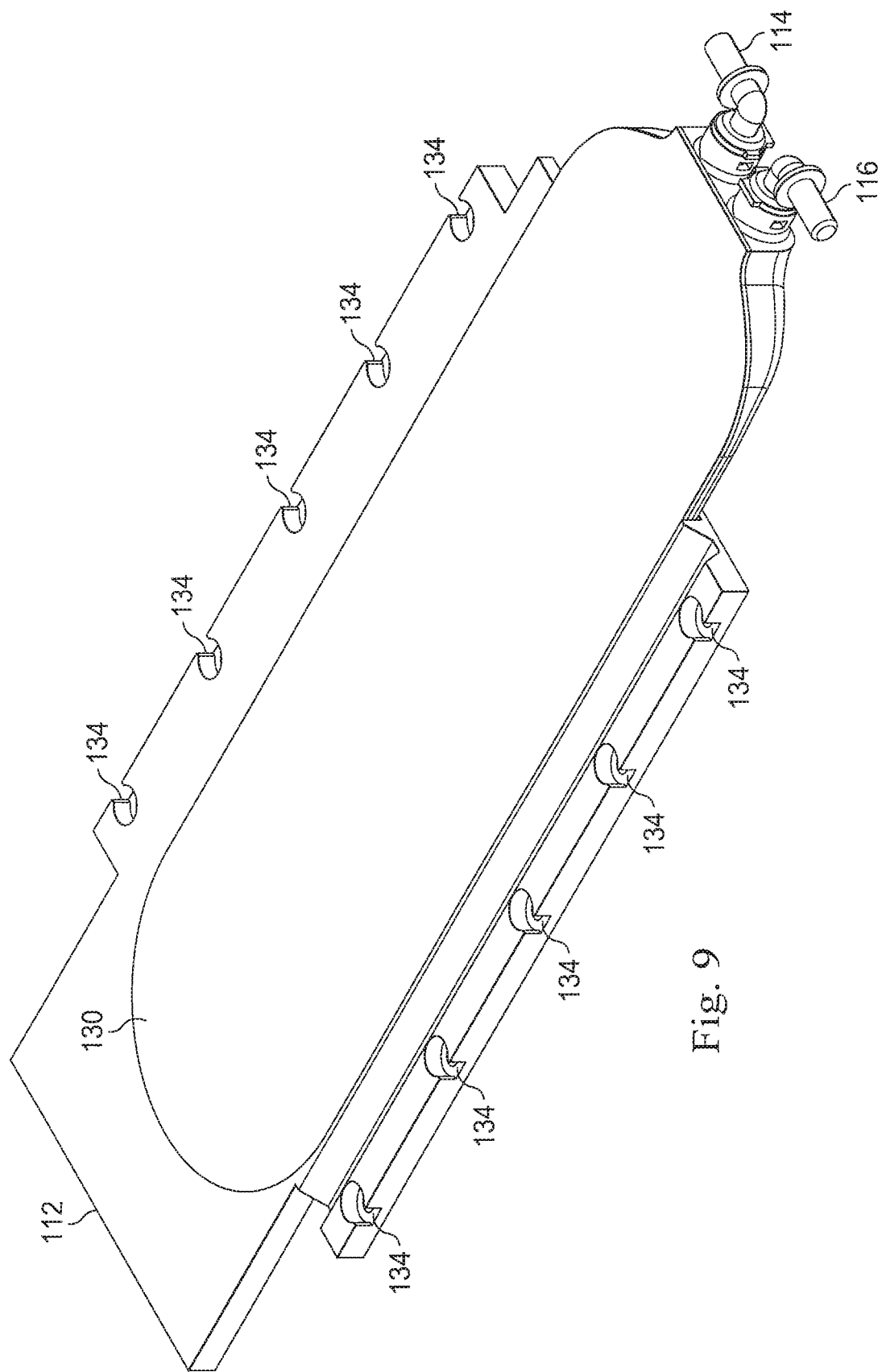
FIG. 9 is a perspective view of an outer side of the cooling subassembly in the battery pack of FIG. 1.
Figure 10:
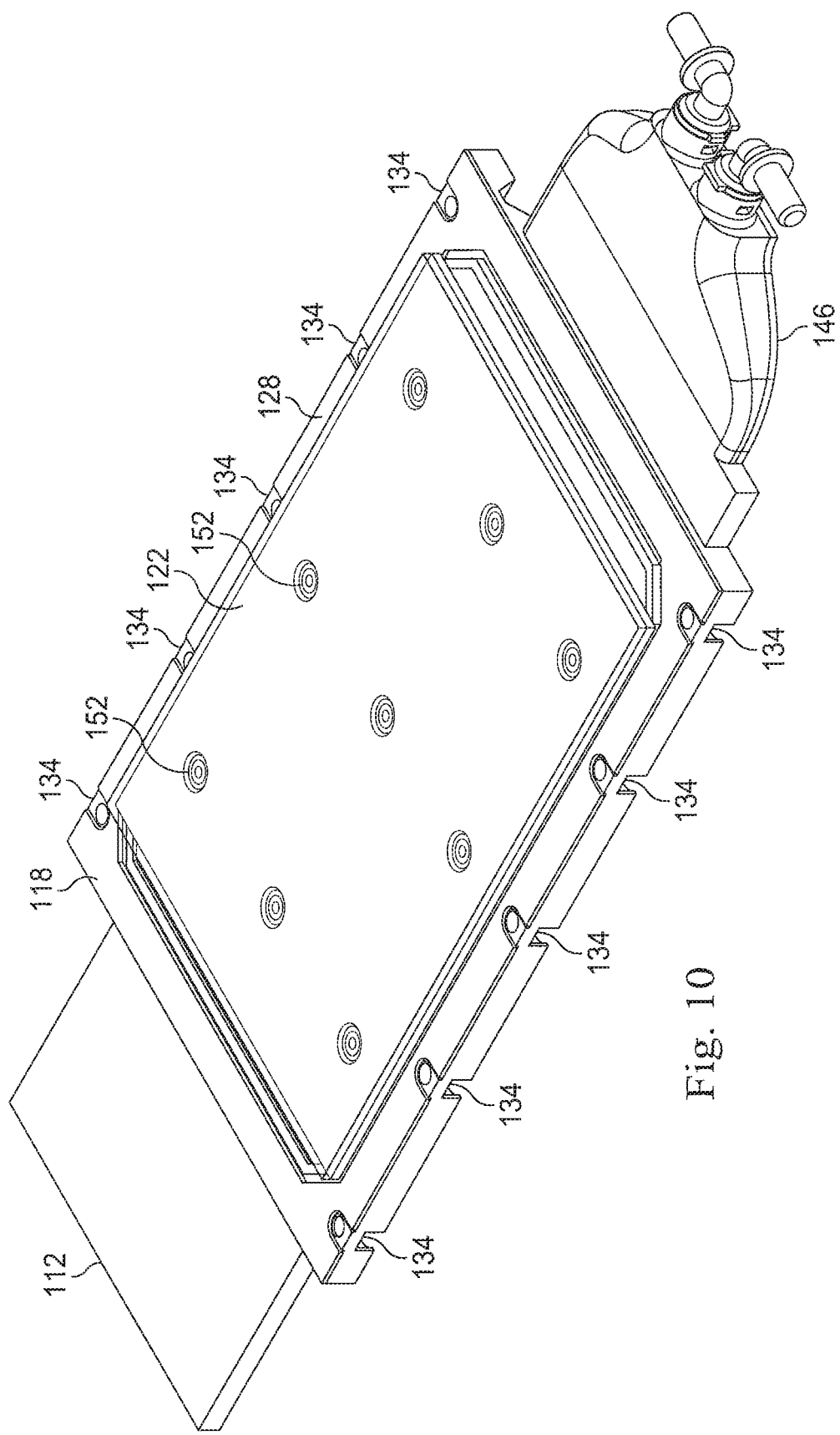
FIG. 10 is a perspective view of an inner side of the cooling subassembly in the battery pack of FIG. 1.
Figure 13:
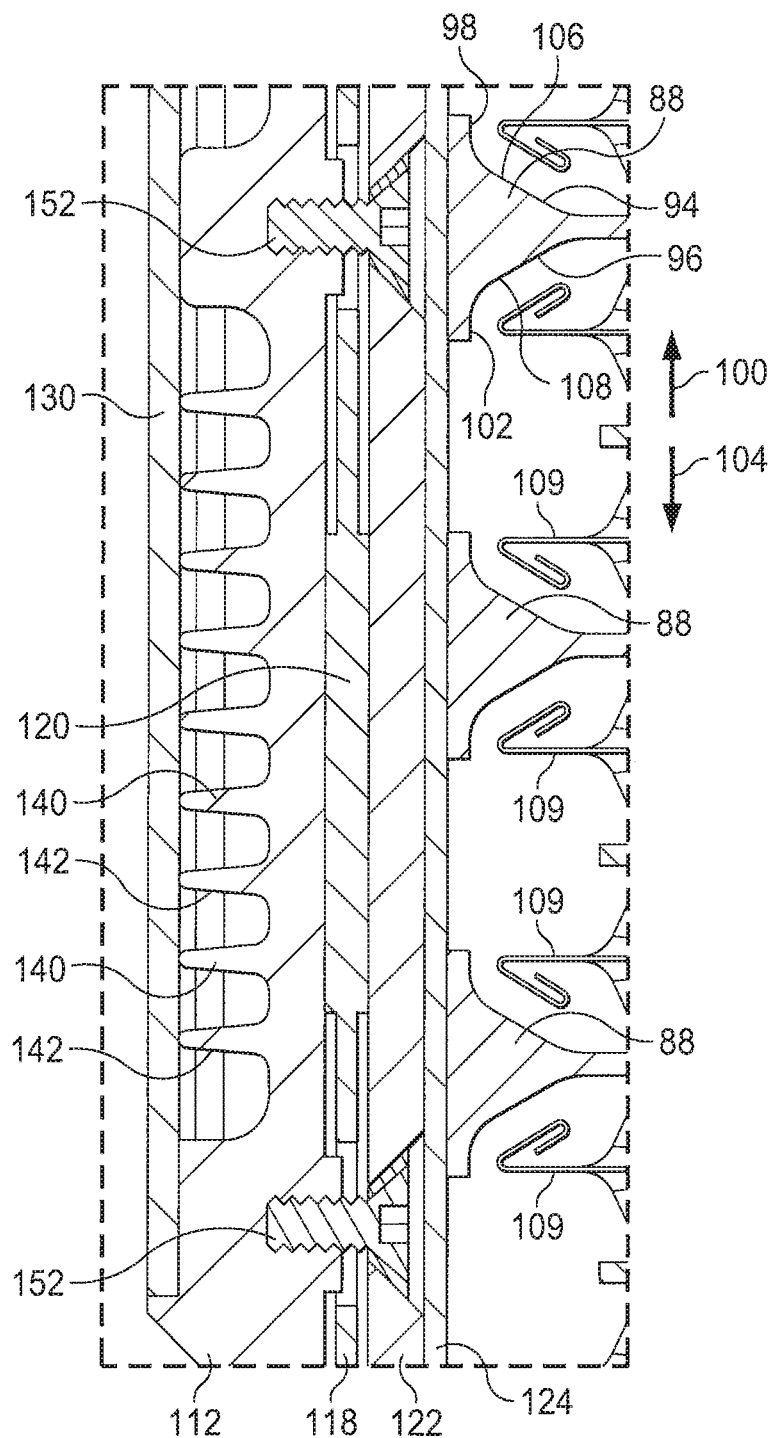
FIG. 13 is a cross-sectional view of a portion of the battery pack of FIG. 1 within a rectangle 13 shown in FIG. 12.

As best shown in FIGS. 8, 12, and 13, the cold plate 112 defines a fluid flow path 137 having an inlet 138 and an outlet 139 in fluid communication with the inlet fitting 114 and the outlet fitting 116, respectively. Fluid (e.g., liquid coolant) flowing through the fluid flow path 137 absorbs heat from the cell stack 34. In this regard, the cooling subassembly 36 acts as a heat exchanger. The cold plate 112 includes a plurality of cooling fins 140 defining fluid channels 142 therebetween. The fluid channels 142 form part of the fluid flow path 137. The cover plate 130 fits over and seals the fluid flow path 137. The cover plate 130 can be welded to the cold plate 112.

The fluid flow path 137 and the cover plate 130 are longitudinally aligned with the opening 26 in the first sidewall 46 of the housing 32. Thus, the fluid flow path 137 is disposed closer to the open end 40 of the housing 40 than to the end wall 50. Therefore, cooling provided by fluid flowing through the fluid flow path 137 is biased toward the tabs 84 of the battery cells 78, which is the location where most of the heat is generated in the battery pack 30.

Figure 2:
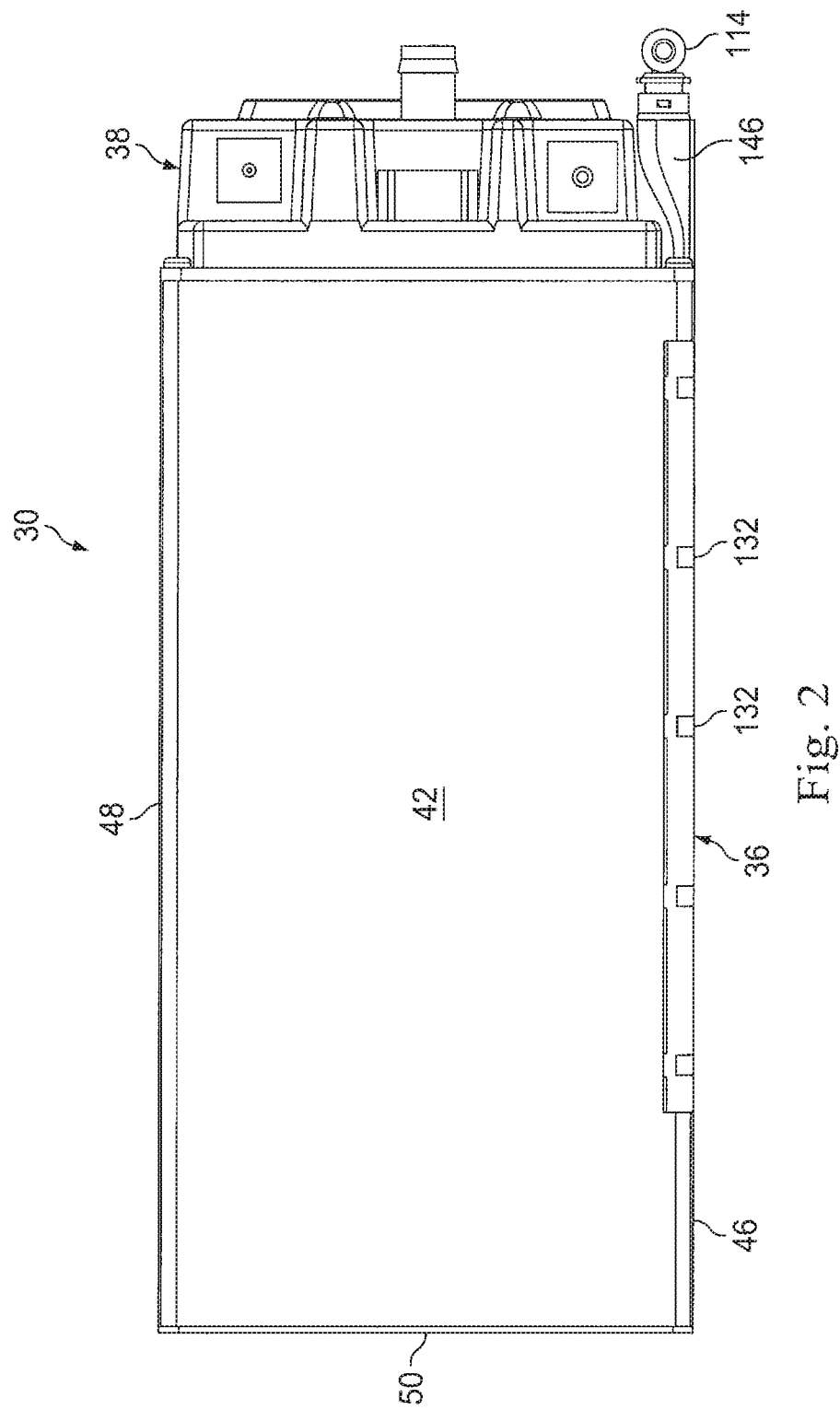
FIG. 2 is a top view of the battery pack of FIG. 1.
Figure 3:
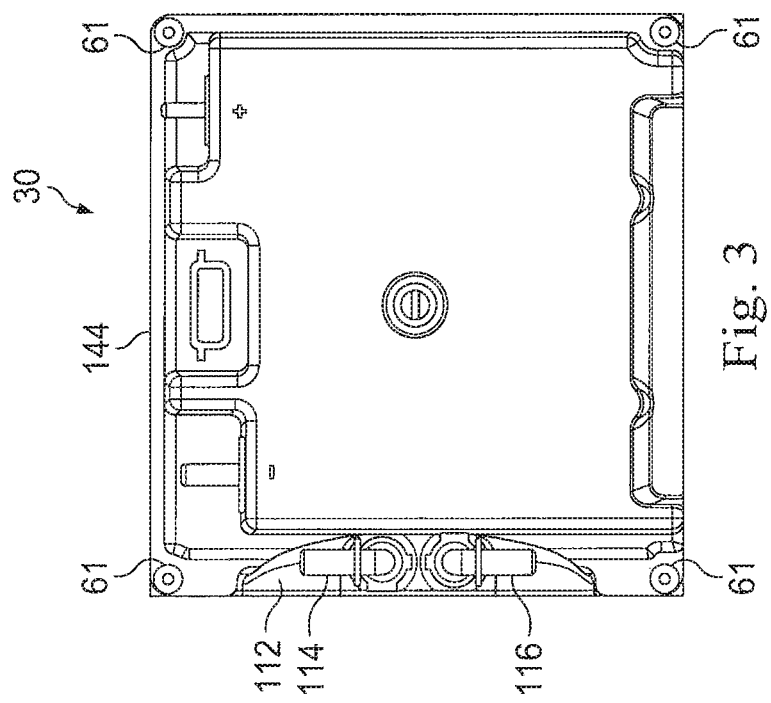
FIG. 3 is a front view of the battery pack of FIG. 1.
Figure 4:
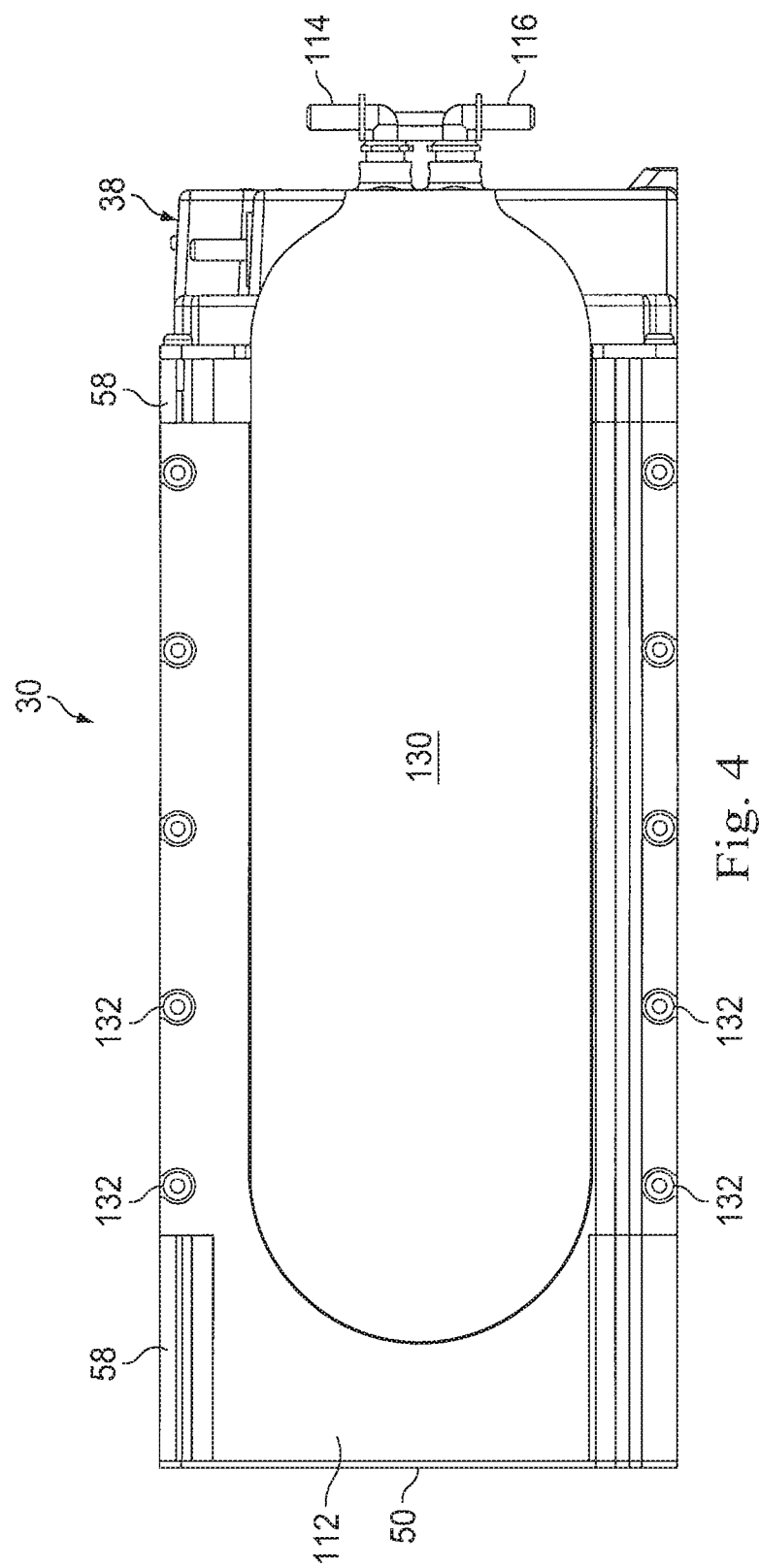
FIG. 4 is a side view of the battery pack of FIG. 1.

As best shown in FIG. 3, the inlet and outlet fittings 114 and 116 are disposed within a rectangular outer profile 144 defined by the top wall 42 of the housing 32, the bottom wall 44 of the housing 32, the first sidewall 46 of the housing 32, and the second sidewall 48 of the housing 32. As best shown in FIG. 2, the cold plate 112 has a gooseneck-shaped portion 146 that enables the inlet and outlet fittings 114 and 116 to fit within the rectangular outer profile 144. The inlet and outlet fittings 114 and 116 can be attached to the inlet 138 and the outlet 139 via threaded connections.

Figure 7:
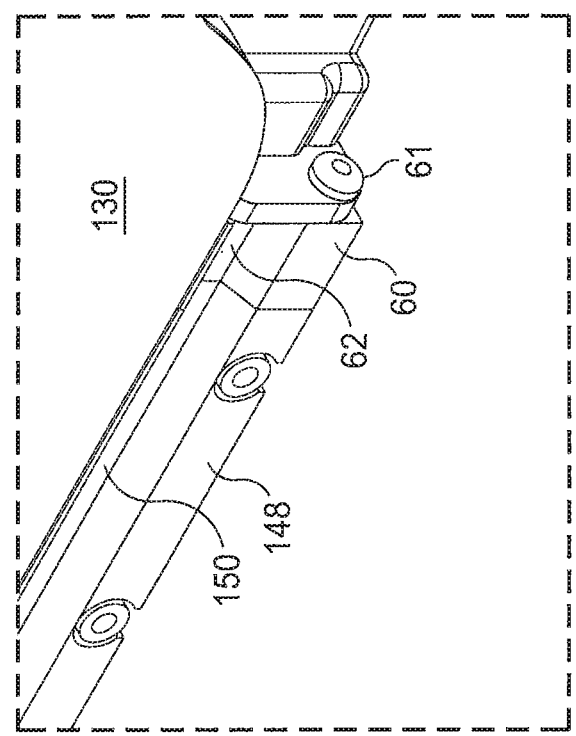
FIG. 7 is a perspective view of a portion of the battery pack of FIG. 1 within a rectangle 7 shown in FIG. 1.

As best shown in FIGS. 1 and 7, the cold plate 112 includes a mounting foot 148 that defines a groove 150 which is vertically and laterally aligned with the grooves 62 in the mounting feet 60 on the first sidewall 46. The grooves 62, 150 cooperate to define a continuous channel for mounting the battery pack 30 in a vehicle. For example, a structural component of a vehicle may include a protrusion that is sized and shaped to fit within and conform to the channel formed by grooves 62, 150. When installing the battery pack 30 in the vehicle, the channel may be slid over the protrusion on the structural component, or the protrusion may be moved into the channel after the battery pack 30 is in place. The channel extends along the entire length L1 (FIG. 1) of the housing 32, and may have the same size and shape as the groove 76 formed in the second sidewall 48.

In a conventional battery pack, the channels for mounting the battery pack are entirely defined by the housing and extend along the entire length of the housing on both longitudinal sides of the housing. However, if the first sidewall 46 of the housing 32 defined a mounting foot with a groove or channel that extends along the entire length of the housing 32, a height H (FIG. 6) of the window 55 would need to be reduced by the height of the mounting foot. Thus, since the cold plate 112 includes the mounting foot 148 defining the groove 150 (i.e., a portion of the channel), the height H of the window 55 does not need to be reduced by the height of the mounting foot 148. Accordingly, the cooling subassembly 36 can absorb more heat from the cell stack 34 that would otherwise be possible.

Referring again to FIGS. 5 and 8-13, when voltage is applied to the TEDs 120, the TEDs 120 generate a temperature difference between the side of the TEDs 120 facing the cell stack 34 and the opposite side of the TEDs 120. Thus, the TEDs 120 can be used to heat or cool the cell stack 34. The TEDs 120 are disposed on and electrically connected to the circuit board 118. The circuit board 118 may be electrically connected to the thermal management module in the cover 38 and may receive power from the cell stack 34 and/or an outside power source through the thermal management module. The thermal management module may control the amount of current supplied to the TEDs 120 and/or the direction in which the current flows through the TEDs 120.

Figure 11:
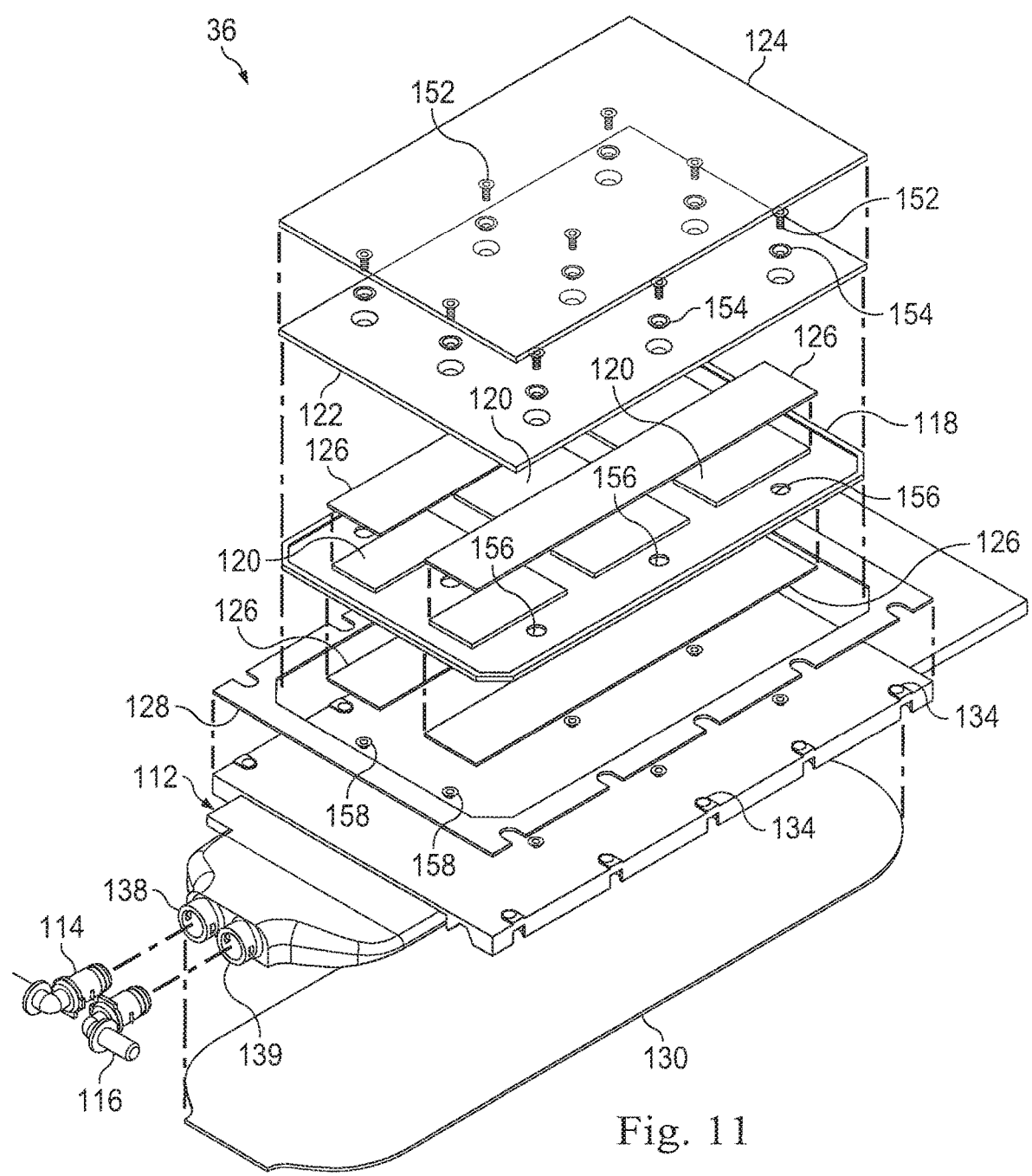
FIG. 11 is an exploded perspective view of the cooling subassembly in the battery pack of FIG. 1.

As best shown in FIG. 11, the TEDs 120 are arranged in rows of three on the circuit board 118, and each of the insulating strips 126 is aligned with one of the rows. Two of the insulating strips 126 are disposed between the TEDs 120 on one side of the circuit board 118 and the cold plate 112, and two of the insulating strips 126 are disposed between the TEDs 120 on the other side of the circuit board 118 and the heat distribution plate 122. The insulating strips 126 electrically insulate the TEDs 120 from the cold plate 112 and the heat distribution plate 122. The insulating strips 126 can be made from compression foam.

The heat distribution plate 122 distributes heat from the cell stack 34 to the TEDs 120. The heat distribution plate 122 can be stamped, cased, or extruded from a metal such as aluminum or steel. The gap pad 124 is disposed between and contacts the heat distribution plate 122 and the heads 88 of the heat spreaders 82. The gap pad 124 enables heat transfer from the cell stack 34 to the cooling subassembly 36 via conduction while providing pliability or compliance to enable assembly of the battery pack 30 despite dimensional tolerances of the components of the battery pack 30. The gap pad 124 can be made from compression foam. The heat distribution plate 122 and the circuit board 118 can be attached to the cold plate 112 using fasteners (e.g., screws)

152 that extend through holes 154 in the heat distribution plate 122, through holes 156 in the circuit board 118, and into blind holes 158 in the cold plate 112.

Figure 16:
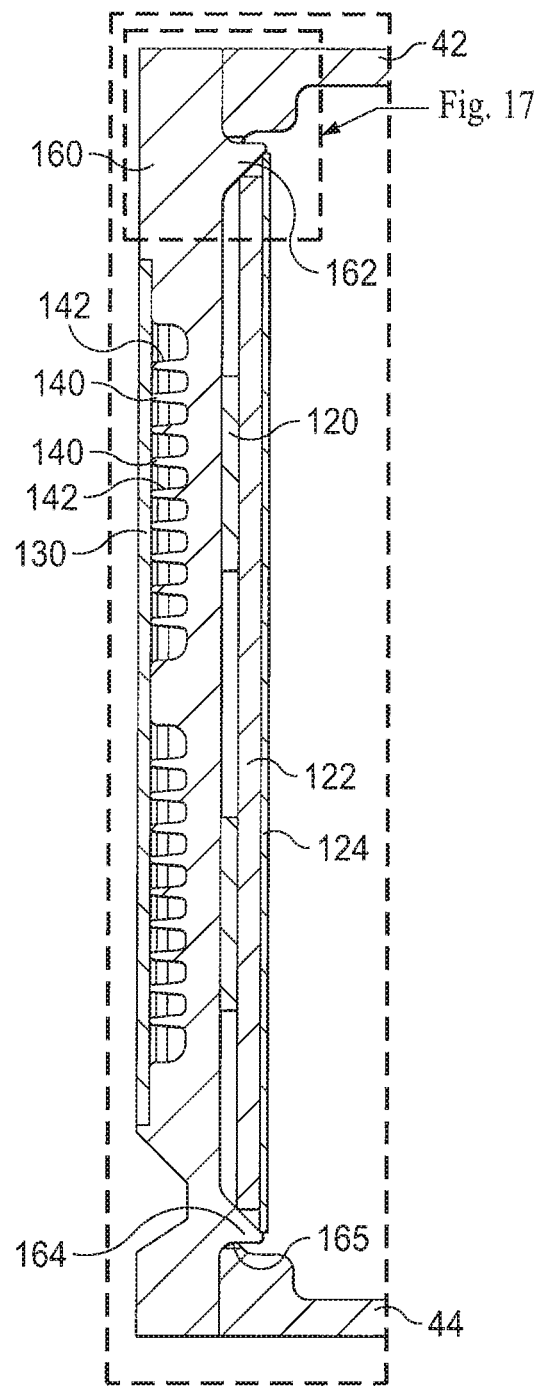
FIG. 16 is a cross-sectional view of a portion of the battery pack of FIG. 1 within a rectangle 16 shown in FIG. 14, the cooling subassembly including a cold plate having a protrusion that extends into the opening in the sidewall of the battery pack.
Figure 17:
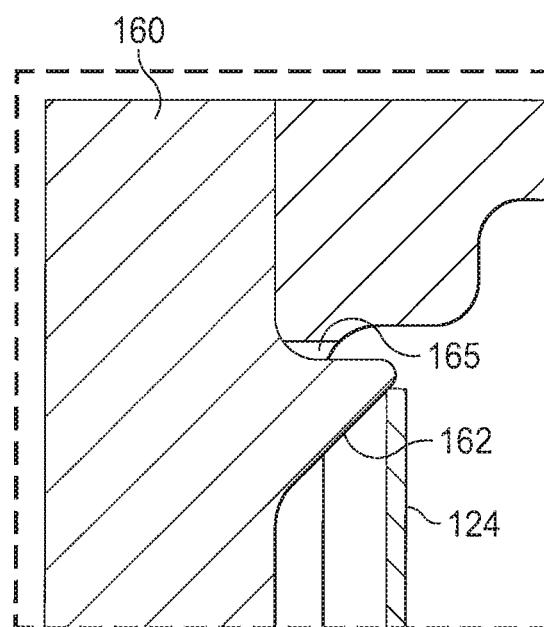
FIG. 17 is a cross-sectional view of a portion of the battery pack of FIG. 15 within a circle 17 shown in FIG. 16.

Referring now to FIGS. 16 and 17, the battery pack 30 is shown with the cooling subassembly 36 including a cold plate 160 in place of the cold plate 112. The cold plate 160 is substantially similar to the cold plate 112 such that only differences between the cold plates 112, 160 will now be discussed. The cold plate 160 includes an upper protrusion 162 and a lower protrusion 164 projecting into the opening 55 in the first sidewall 46 of the housing 32 and engaging an inner peripheral edge 165 of the opening 55. The protrusions 162, 164 may have a triangular profile as shown and may extend along the entire length of the cold plate 160 or only a portion thereof. In various implementations, each of the protrusions 162, 164 may include a pair of protrusions longitudinally spaced apart from one another and disposed at opposite longitudinal ends of the cold plate 160.

If a vehicle containing the battery pack 30 is impacted, the battery pack 30 may experience a load due to the impact. The protrusions 162, 164 on the cold plate 160 absorb a portion of the load on the battery pack 30 due to the impact that would otherwise be entirely absorbed by the fasteners 132 attaching the cooling subassembly 36 to the housing 32. Thus, the protrusions 162, 164 improve the structural integrity of the battery pack 30, especially in situations where the battery pack 30 experience a vertical load that would shear the fasteners 132 but for the protrusions 162, 164.

Figure 18:
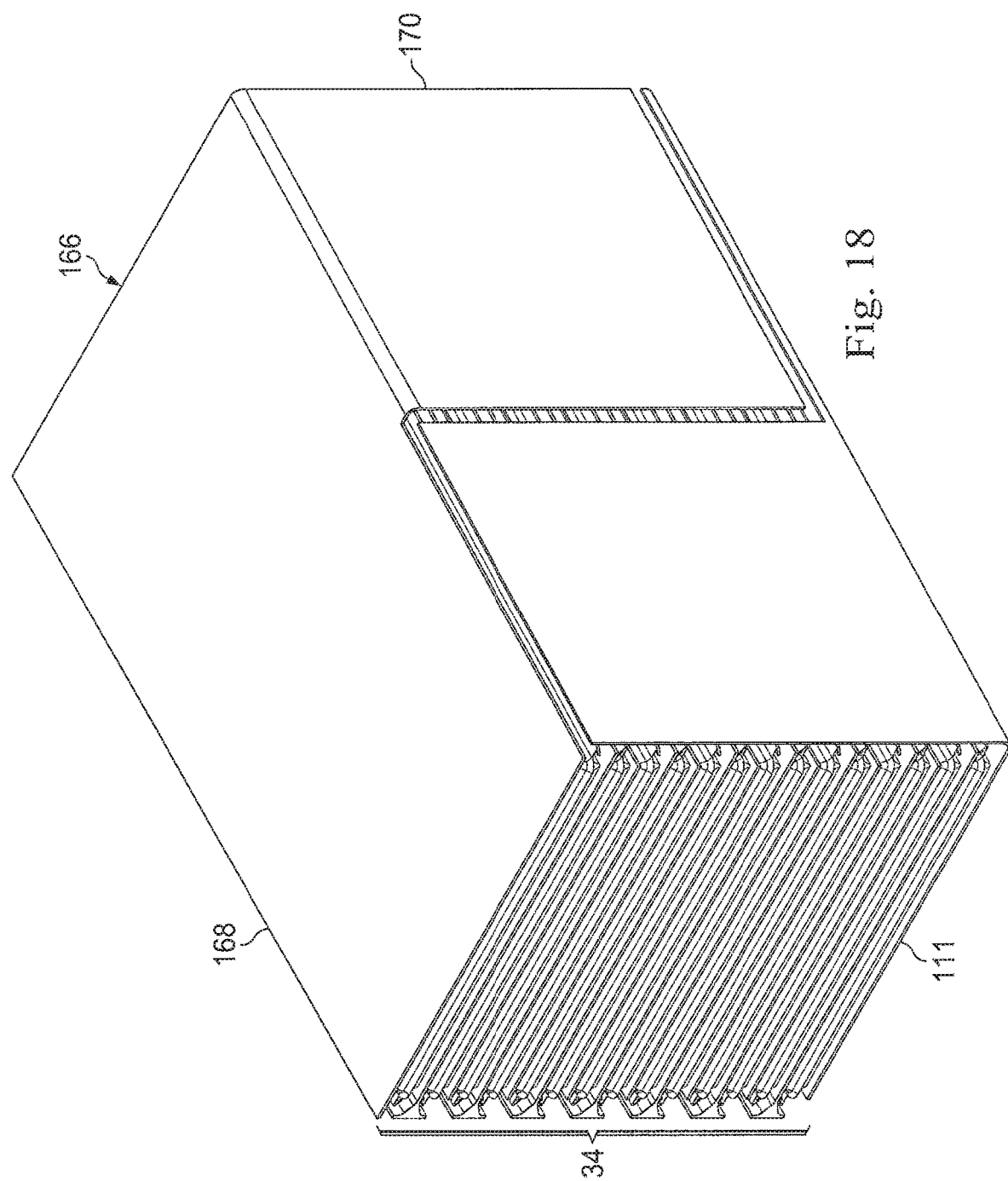
FIG. 18 is a perspective view of a plurality of battery cells with heat spreaders disposed between adjacent ones of the battery cells and two end plates according to the present disclosure covering three sides of the battery pack.

Referring now to FIG. 12, the heat spreaders 82 may absorb heat from the housing 32 due to the proximity of the second longitudinal sides 92 of the heat spreaders 82 to the second sidewall 48 of the housing 32. With additional reference to FIG. 18, a portion of the battery pack 30 is shown with an end plate 166 replacing the upper one of the end plates 111 to address the aforementioned issue. As shown in FIG. 5, the end plates 111 are flat and only cover the top and bottom sides of the cell stack 38. In contrast, the end plate 166 includes a first portion 168 that covers the top of the cell stack 38 and a second portion 170 that covers the side of the cell stack 38 adjacent to the second sidewall 48 of the housing 32. Thus, the end plate 166 electrically and thermally insulates the cell stack 38 from the top wall 42 of the housing and the second sidewall 48 of the housing 32. Therefore, the second longitudinal sides 92 of the heat spreaders 82 may extend closer to the second sidewall 48 of the housing 32 without absorbing heat from the housing 32. As a result, the heat spreaders 82 may have a greater length (and therefore surface area) than would otherwise be possible without the second portion 170 the second portion 170 of the end plate 166, which may increase the amount of heat absorbed by the heat spreaders 82.

Figure 19:
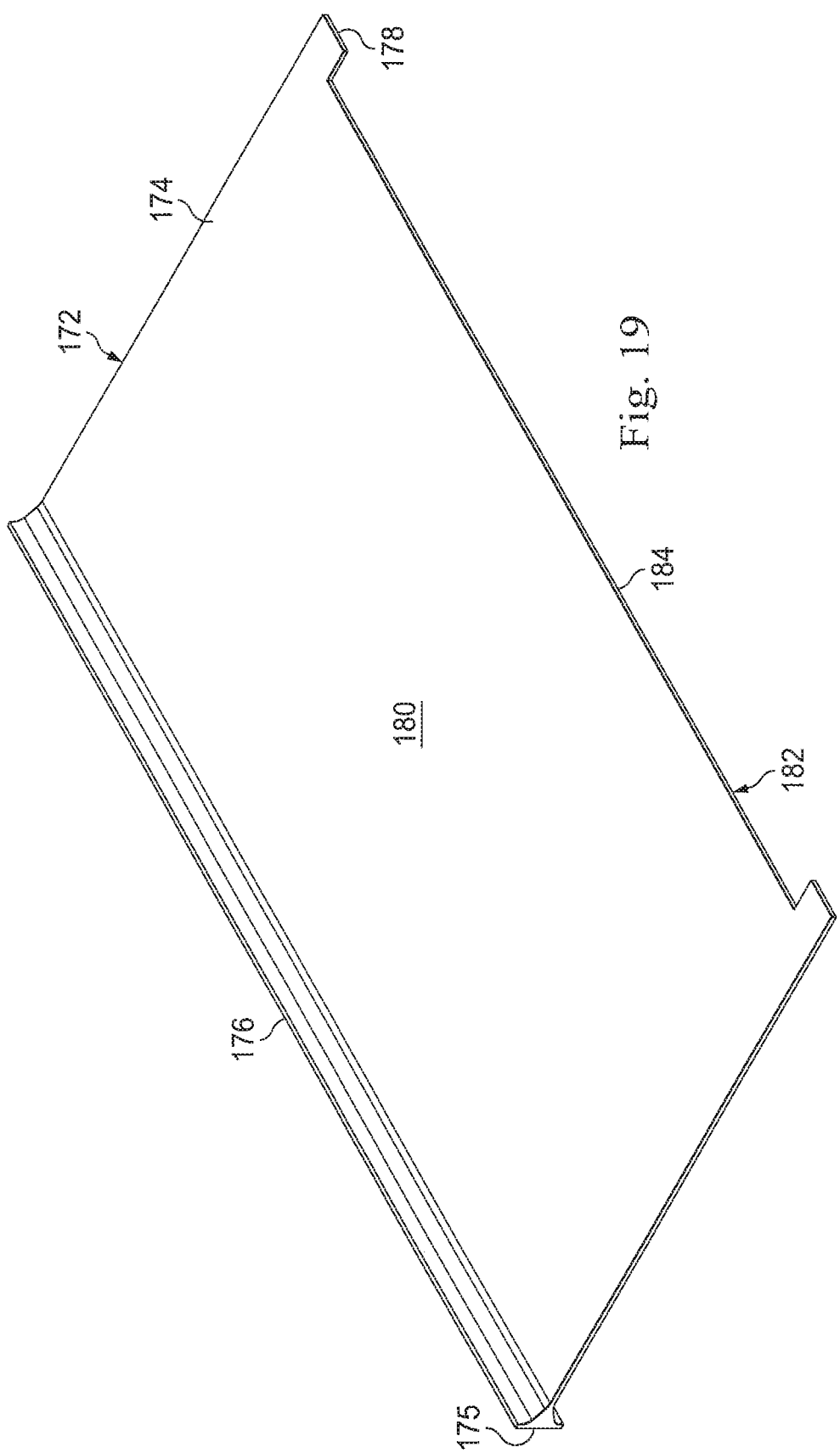
FIG. 19 is a perspective view of a heat spreader according to the present disclosure having a t-shaped profile with a head at one end and an inset portion or cut-out at the opposite end.

Referring now to FIG. 19, a heat spreader 172 may be included in the battery pack 30 in place of each of the heat spreaders 82. Similar to each of the heat spreaders 82, the heat spreader 172 may be formed from a metal (e.g., aluminum), and the heat spreader 172 includes a flat body 174 and a head 175 that collectively have a T-shaped profile. The flat body 174 has a first longitudinal side 176, a second longitudinal side 178 opposite of the first longitudinal side 176, a first major surface 180 extending between the first and second longitudinal sides 176 and 178, and a second major surface 182 opposite of the first major surface 180. The head 88 is attached to the first longitudinal side 90 of the flat body 86.

In contrast to the flat body 86 of each of the heat spreaders 82, the second longitudinal side 178 of the flat body 174 of the heat spreader 172 includes an inset portion 184 that is inset relative to the remainder of the second longitudinal side 178. The inset portion 184 of the heat spreader 172 provides additional clearance between the heat spreader 172 and the second sidewall 48 of the housing 32, which may reduce the amount of heat that the heat spreader 172 absorbs from the housing 32. The inset portion 184 may be formed with the remainder of the heat spreader 172 in a single operation (e.g., extrusion), or the inset portion 184 may be formed in a secondary operation (e.g., die cut) after the remainder of the heat spreader 172 is formed.

Figure 20:
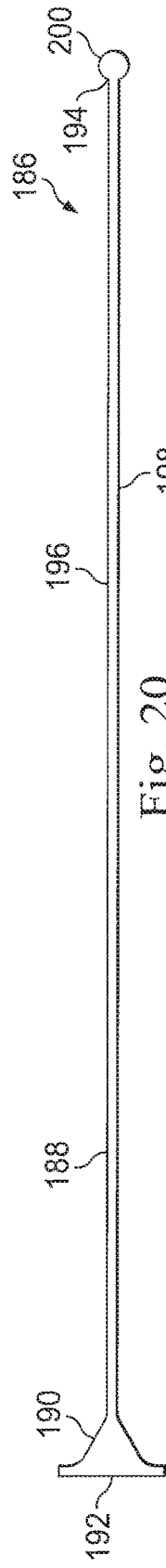
FIG. 20 is a side view of another heat spreader according to the present disclosure having a t-shaped profile with a head at one end and hollow cylindrical portion at the opposite end.
Figure 21:
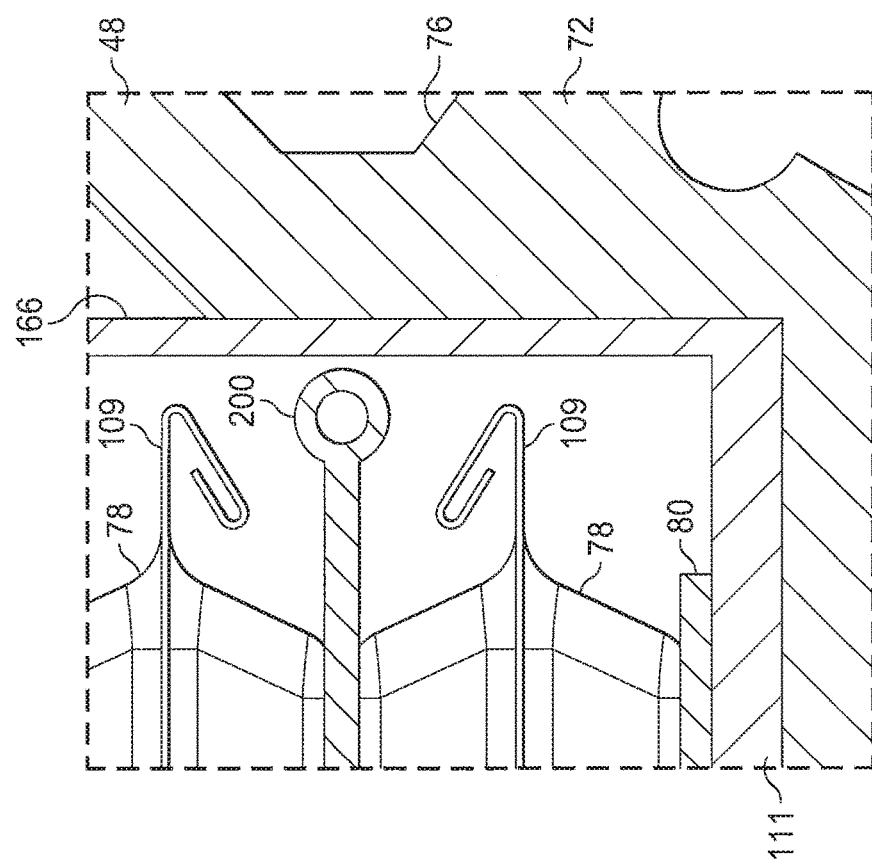
FIG. 21 is a cross-sectional view of a portion of the battery pack of FIG. 1 within a rectangle 21 shown in FIG. 14, the battery pack including the heat spreader of FIG. 20 rather than the heat spreader of FIG. 14.

Referring now to FIGS. 20 and 21, a heat spreader 186 may be included in the battery pack 30 in place of each of the heat spreaders 82. Similar to each of the heat spreaders 82, the heat spreader 186 may be formed from a metal (e.g., aluminum), and the heat spreader 186 includes a flat body 188 and a head 190 that collectively have a T-shaped profile. The flat body 188 has a first longitudinal side 192, a second longitudinal side 194 opposite of the first longitudinal side 192, a first major surface 196 extending between the first and second longitudinal sides 192 and 194, and a second major surface 198 opposite of the first major surface 196. The head 90 is attached to the first longitudinal side 192 of the flat body 188.

In contrast to the heat spreaders 82, the heat spreader 186 includes a cylindrical body 200 attached to the second longitudinal side 194 of the flat body 188. The cylindrical body 200 may provide a line contact between the heat spreader 186 and the second sidewall 48 of the housing 32 if there is no gap between the heat spreader 186 and the second sidewall 48. Thus, the portion of the second longitudinal side 194 of the heat spreader 186 in contact with the second sidewall 48 may be less than the portion of each of the heat spreaders 82 in contact with the second sidewall 48. Therefore, the heat spreader 186 may absorb less heat from the second sidewall 48 than each of the heat spreaders 82 when the heat spreaders 82, 186 are sized to contact the second sidewall 48. In addition, the cylindrical body 200 may be hollow as shown in FIG. 21, which may further improve the amount of thermal insulation provided by the heat spreader 186.

Since the cylindrical body 200 may enable the heat spreader 186 to contact the second sidewall 48 without absorbing as much heat as the heat spreaders 82, the cylindrical body 200 may enable sizing the heat spreader 186 to contact the second sidewall 48. As a result, the heat spreader 186 may add to the strength of the housing 32 to withstand vehicle impacts that impart a load on the battery pack 30. In addition, due to its round shape, the cylindrical body 200 may prevent the second sidewall 48 from catching on the heat spreader 186 when the battery pack 30 is assembled. Further, the cylindrical body 200 may help to balance a die if an extrusion process is used to make the heat spreader 186.

Figure 22:
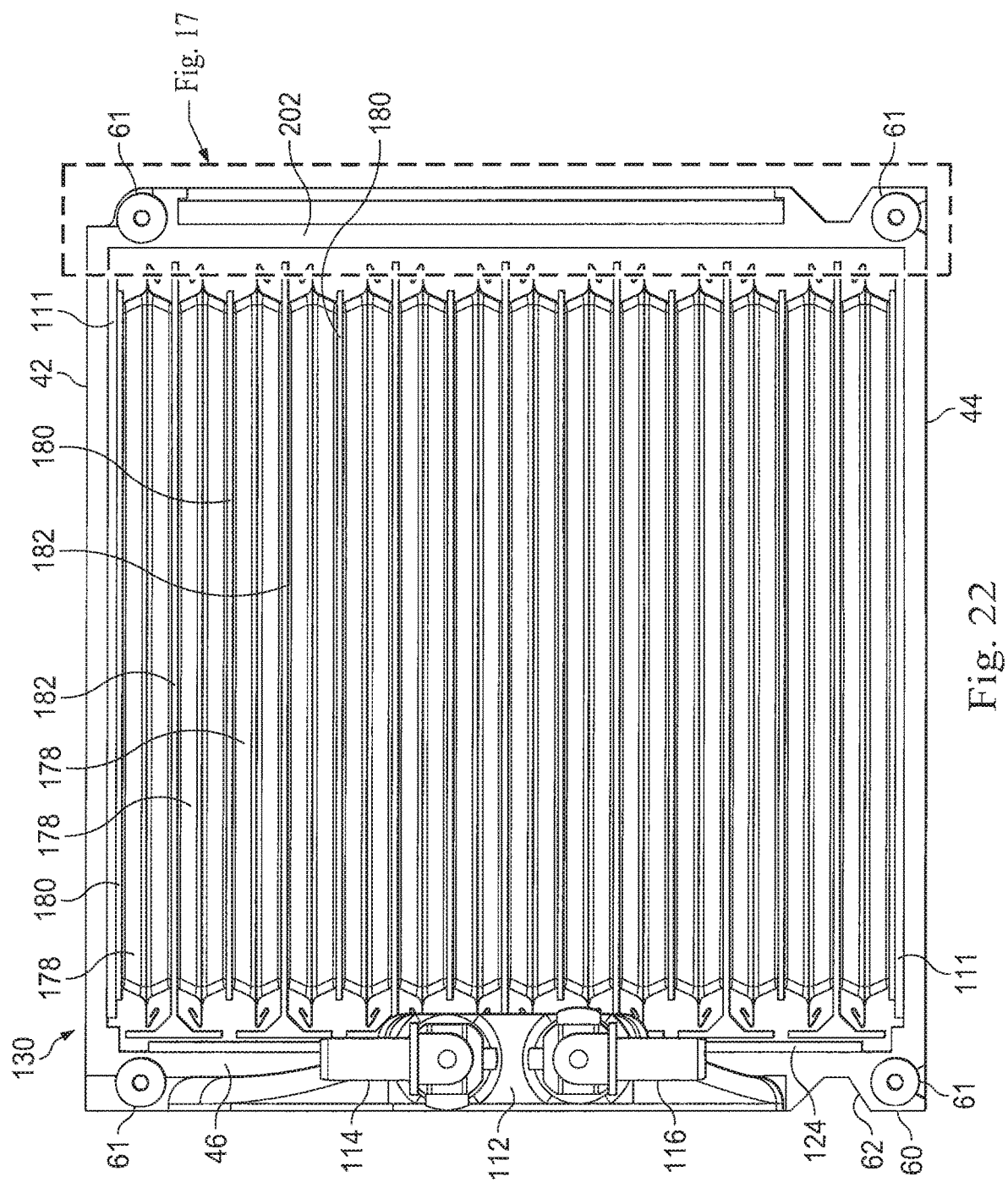
FIG. 22 is a front view of the battery pack of FIG. 1 similar to that of FIG. 3 except that a cover of the battery pack is removed and one side of the battery pack is modified to accommodate a reinforcement plate.
Figure 23:
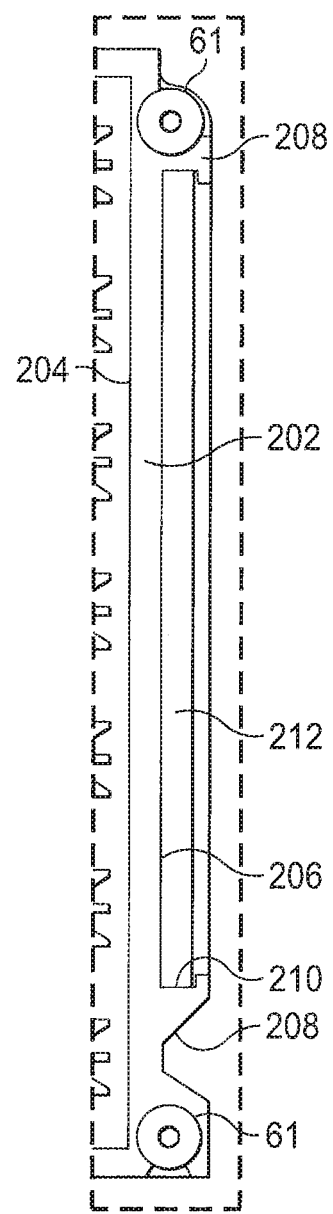
FIG. 23 is an end view of the portion of a portion of the battery pack of FIG. 1 within a rectangle 23 shown in FIG. 22.

Referring now to FIGS. 22 and 23, the battery pack 30 is shown with the housing 32 including a second sidewall 202 in place of the second sidewall 48. The second sidewall 202 has an inner surface 204, an outer surface 206, and a pair of flanges 208 projecting from the outer surface 206 and defining a channel 210. In FIGS. 22 and 23, the battery pack 30 further includes a plate 212 that is disposed within the channel 210. The plate 212 may be slid into the channel 210 as the battery pack 30 is assembled, and then secured within the channel 210 using, for example, fasteners (not shown) that extend through the plate 212 and into the second sidewall 202.

Similar to the second sidewall 48, the second sidewall 202 may be extruded form a metal such as aluminum. However, a thickness T2 of the second sidewall 202 may be limited due to the extrusion process. Thus, by forming the second sidewall 202 and the plate 212 as separate components, the second sidewall 202 and the plate 212 may have a greater combined thickness and strength than would otherwise be possible with the second sidewall 202 alone. In addition, the plate 212 may be formed (e.g., forged, cast) from a metal (e.g., steel) that is stronger than aluminum, which may further add to the strength of the second sidewall 202.

Figure 24:
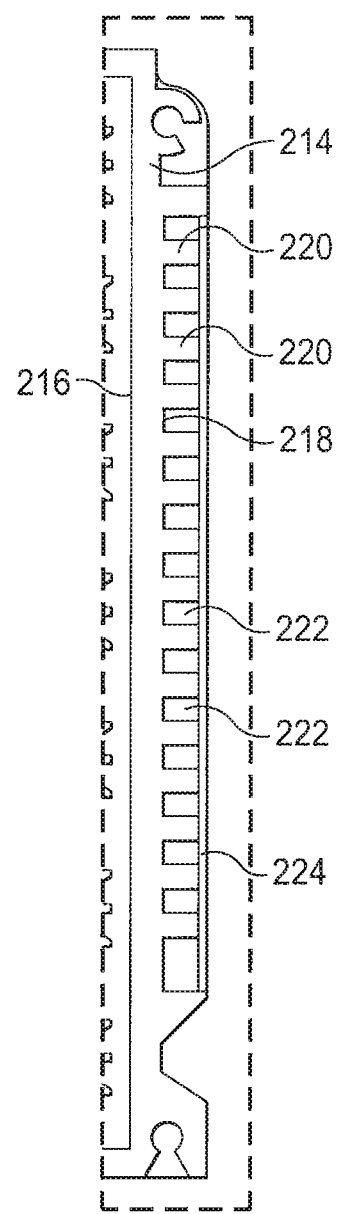
FIG. 24 is an end view of the battery pack of FIG. 1 similar to the end view of FIG. 23 except that the one side of the battery pack is modified in a different way to accommodate the reinforcement plate.

Referring now to FIG. 24, the housing 32 of the battery pack 30 may include a second sidewall 214 in place of the second sidewall 48. The second sidewall 214 has an inner surface 216, an outer surface 218, and a plurality of cooling fins 220 projecting from the outer surface 218 of the second sidewall 214. The outer surface 218 of the second sidewall 214 and adjacent ones of the fins 220 cooperate to define insulating pockets 222. In FIG. 24, the battery pack 30 further includes a plate 224 disposed over the fins 220 and enclosing the pockets 222. The plate 224 may be welded to the outer surface 218 of the second sidewall 214.

Similar to the second sidewall 48, the second sidewall 214 may be extruded from a metal such as aluminum. Thus, as discussed above, by forming the second sidewall 214 and the plate 224 as separate components, the second sidewall 214 and the plate 224 may have a greater combined thickness and strength than would otherwise be possible with the second sidewall 214 alone. In addition, the plate 212 may be formed (e.g., forged, cast) from a metal (e.g., steel) that is stronger than aluminum, which may further add to the strength of the second sidewall 214.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A battery pack for a vehicle, the battery pack comprising:
    a housing having a bottom wall, a top wall, a first sidewall, a second sidewall disposed opposite of the first sidewall, an end wall, and an open end opposite of the end wall and adjoining the bottom wall, the top wall, the first sidewall, and the second sidewall, the first sidewall having an inner surface, an outer surface, and an opening that extends through the inner and outer surfaces, wherein the outer surface of the first sidewall of the housing defines a first groove for mounting the battery pack in the vehicle;
    a plurality of battery cells disposed within the housing, each the plurality of battery cells including cell tabs disposed adjacent to the open end of the housing;
    a cover disposed over the open end of the housing; and
    a cooling subassembly disposed over the opening in the first sidewall of the housing, the cooling subassembly including a cold plate and a plurality of thermoelectric devices, wherein the cold plate includes at least one protrusion projecting into the opening in the first sidewall of the housing and engaging an inner peripheral edge of the opening.

2. The battery pack of claim 1 wherein the open end of the housing is disposed within a first plane, and the opening in the first sidewall of the housing is disposed within a second plane that intersects the first plane.

3. The battery pack of claim 1 wherein the opening in the first sidewall of the housing is located closer to the open end of the housing than the end wall of the housing.

4. The battery pack of claim 1, wherein the cold plate of the cooling subassembly defines a second groove that is aligned with the first groove, the first and second grooves defining a channel for mounting the battery pack in the vehicle.

5. A battery pack for a vehicle, the battery pack comprising:
    a housing having a bottom wall, a top wall, a first sidewall, a second sidewall disposed opposite of the first sidewall, an end wall, and an open end opposite of the end wall and adjoining the bottom wall, the top wall, the first sidewall, and the second sidewall, the first sidewall having an inner surface, an outer surface, and an opening that extends through the inner and outer surfaces, wherein the second sidewall of the housing has an inner surface, an outer surface, and a plurality of fins projecting from the outer surface of the housing, the outer surface of the housing and adjacent ones of the plurality of fins cooperating to define insulating pockets, the battery pack further comprising a plate disposed over the fins and enclosing the insulating pockets;
    a plurality of battery cells disposed within the housing, each the plurality of battery cells including cell tabs disposed adjacent to the open end of the housing;
    a cover disposed over the open end of the housing; and
    a cooling subassembly disposed over the opening in the first sidewall of the housing, the cooling subassembly including a cold plate and a plurality of thermoelectric devices.

6. The battery pack of claim 5 wherein the open end of the housing is disposed within a first plane, and the opening in the first sidewall of the housing is disposed within a second plane that intersects the first plane.

7. The battery pack of claim 5 wherein the opening in the first sidewall of the housing is located closer to the open end of the housing than the end wall of the housing.

8. The battery pack of claim 5, wherein the cold plate of the cooling subassembly defines a second groove that is aligned with the first groove, the first and second grooves defining a channel for mounting the battery pack in the vehicle.

9. A battery pack for a vehicle, the battery pack comprising:
    a housing having a bottom wall, a top wall, a first sidewall, a second sidewall disposed opposite of the first sidewall, an end wall, and an open end opposite of the end wall and adjoining the bottom wall, the top wall, the first sidewall, and the second sidewall, the first sidewall having an inner surface, an outer surface, and an opening that extends through the inner and outer surfaces, wherein the second sidewall of the housing has an inner surface, an outer surface, and a pair of flanges projecting from the outer surface and defining a channel, the battery pack further comprising a plate that is retained within the channel;
    a plurality of battery cells disposed within the housing, each the plurality of battery cells including cell tabs disposed adjacent to the open end of the housing;
    a cover disposed over the open end of the housing; and a cooling subassembly disposed over the opening in the first sidewall of the housing, the cooling subassembly including a cold plate and a plurality of thermoelectric devices.

10. The battery pack of claim 9, wherein the open end of the housing is disposed within a first plane, and the opening in the first sidewall of the housing is disposed within a second plane that intersects the first plane.

11. The battery pack of claim 9, wherein the opening in the first sidewall of the housing is located closer to the open end of the housing than the end wall of the housing.

12. The battery pack of claim 9, wherein the cold plate of the cooling subassembly defines a second groove that is aligned with the first groove, the first and second grooves defining a channel for mounting the battery pack in the vehicle.

* * * * *